United States Patent
Giefer et al.

(10) Patent No.: US 7,322,457 B2
(45) Date of Patent: Jan. 29, 2008

(54) SHIFTING DEVICE FOR THE MECHANICAL COUPLING-FREE TRANSMISSION OF SHIFT COMMANDS TO THE AUTOMATIC TRANSMISSION OF A MOTOR VEHICLE

(75) Inventors: Andreas Giefer, Lemförde (DE); Jörg Meyer, Wagenfeld (DE)

(73) Assignee: ZF Lemförder MetallWaren AG (DE)

( * ) Notice: Subject to any disclaimer, the term of this patent is extended or adjusted under 35 U.S.C. 154(b) by 116 days.

(21) Appl. No.: 11/157,413

(22) Filed: Jun. 21, 2005

(65) Prior Publication Data

US 2005/0239596 A1 Oct. 27, 2005

Related U.S. Application Data

(63) Continuation of application No. PCT/DE2004/001144, filed on Jun. 4, 2004.

(30) Foreign Application Priority Data

Jun. 6, 2003 (DE) ................. 103 26 118

(51) Int. Cl.
*B60W 10/18* (2006.01)
(52) U.S. Cl. ................ 192/219.4; 74/473.14; 74/473.18; 74/473.19; 74/473.25; 74/473.3; 74/473.33
(58) Field of Classification Search ............ 192/219.4; 74/473.12, 473.14, 473.18, 473.19, 473.25, 74/473.3, 473.33
See application file for complete search history.

(56) References Cited

U.S. PATENT DOCUMENTS 3,241,640 A 3/1966 McCordic et al.

| | | | |
|---|---|---|---|
| 6,550,351 B1 * | 4/2003 | O'Reilly et al. | ............ 74/335 |
| 6,662,924 B2 | 12/2003 | Giefer et al. | |
| 6,732,847 B1 * | 5/2004 | Wang | ............ 192/220.4 |
| 6,848,331 B2 * | 2/2005 | Syamoto | ............ 74/473.23 |
| 6,851,538 B2 * | 2/2005 | Meyer et al. | ............ 192/219.4 |
| 6,889,812 B2 * | 5/2005 | Wendeberg et al. | ..... 192/219.4 |
| 2002/0170376 A1 | 11/2002 | Giefer et al. | |

FOREIGN PATENT DOCUMENTS

| DE | 44 22 257 C1 | 11/1995 |
| DE | 195 33 141 C1 | 2/1997 |
| DE | 196 43 812 A1 | 5/1998 |
| DE | 198 31 069 A1 | 1/2000 |
| DE | 100 05 167 C2 | 8/2001 |
| DE | 101 25 526 A1 | 12/2002 |

* cited by examiner

*Primary Examiner*—David D. Le
(74) *Attorney, Agent, or Firm*—McGlew & Tuttle P.C.

(57) ABSTRACT

A shifting device (1) for the mechanical coupling-free transmission of shift commands to an automatic transmission of a motor vehicle (shift-by-wire shifting), with at least one housing and/or one frame and one selector lever for the manual selection of shift commands for the vehicle transmission in at least one shift gate. The selector lever can be moved manually into at least four positions (P, R, N, D), pivotable about at least one shift axis. A transmission device(s) transmits the shift commands without mechanical coupling with the vehicle transmission (shift by wire). A mechanical coupling (16) is provided between the selector lever (2) and the transmission of the vehicle. This mechanical coupling (16) activates the parking brake exclusively and automatically when the selector lever (2) is engaged in the P position and is automatically uncoupled from the selector lever when the selector lever (2) is pivoted out beyond the adjacent position.

25 Claims, 15 Drawing Sheets

SHIFTING DEVICE FOR THE MECHANICAL COUPLING-FREE TRANSMISSION OF SHIFT COMMANDS TO THE AUTOMATIC TRANSMISSION OF A MOTOR VEHICLE

CROSS REFERENCE TO RELATED APPLICATION

This is a Continuation of and claims the benefit (35 U.S.C. § 120 and 365(c)) of copending International Application PCT/DE2004/001144 of Jun. 4, 2004, which designated inter alia the United States and which claims the priority of German Application DE 103 26 118.4 of Jun. 6, 2003, and the entire contents of each application is hereby incorporated by reference in its entirety.

FIELD OF THE INVENTION

The present invention pertains to a shifting device for the mechanical coupling-free transmission of shift commands to the automatic transmission of a motor vehicle, i.e., a so-called shift-by-wire shifting device, with at least one housing and/or a frame, a selector lever for the manual selection of shift commands for the transmission of the motor vehicle in at least one shift gate, wherein the selector lever can be moved manually into at least four positions (P, R, N, D), pivotable about at least one shift axis, with transmission devices for transmitting the shift commands without mechanical coupling to the transmission of the motor vehicle, and with a parking brake in the P position of the selector lever, which locks at least one output shaft of the transmission.

BACKGROUND OF THE INVENTION

It is necessary in automatic transmissions that a transmission output shaft be blocked when engaging the "P" position of the selector lever in order to prevent the vehicle from rolling away. In the novel, so-called shift-by-wire shifting devices, the selector lever position at the shifting device is detected and electrically transmitted to the transmission control device, and there is no longer any mechanical connection between the shifting device and the transmission. The transmission control device implements the driver's desire by energizing an actuator (for example, an electric motor on the selector shaft) or directly electromagnetic valves in the transmission.

Such a shifting device with parking brake, which is engaged by means of a pretensioned spring and can be disengaged by admitting the system pressure of the hydraulic transmission control, is described in the German Offenlegungsschrift No. DE 196 43 812 A1.

The drawback of such solutions with spring-loaded mechanism is that auxiliary energy is always necessary to disengage the parking brake. If this is not available, for example, due to a defect in the hydraulic system of the transmission, due to the engine not running or due to the battery having been removed, an emergency unlocking is to be provided in order to make it possible to push the vehicle, for example, in an emergency or in the repair shop. Making such an emergency unlocking is correspondingly complicated and expensive.

Another drawback of such a solution with spring-loaded mechanism is that the engagement of the parking brake cannot be triggered under all circumstances by means of the selector lever. If the electric communication between the shifting device and the transmission is interrupted, the parking brake can be engaged only by interrupting the supply of the auxiliary energy. This requires, for example, that the engine must be turned off in order to allow the hydraulic system pressure to collapse, as a result of which the spring-loaded mechanism will engage the parking brake.

A possibility of actively engaging and disengaging the parking brake under all circumstances and at any time can be achieved by the use of a cable, which is arranged between the shifting device and the transmission, as in the convectional, mechanically connected automatic shifting devices. This cable is then moved by the selector lever during each shifting movement, but it is used only to engage and disengage the parking brake. The positions P, R, N and D are, however, transmitted electrically now. Since this cable is directly or indirectly connected to the selector lever, it is also moved along during the movement between all positions in which no parking brake is activated or deactivated, i.e., it travels a relatively great distance, whereas only a relatively short path would be necessary for engaging and disengaging the parking brake. The friction generated during the unnecessary movement of the cable has an adverse effect on the feeling of shifting during shifting in the non-P positions.

Another possibility, which solves the problem of the cable being moved continuously, is described in DE 101 25 526 A1. The coupling and uncoupling of the cable for the parking brake and the selector lever is achieved here by a catching device, which can be actuated manually indirectly or directly. If the cable to the parking brake is connected to the selector lever, this connection must again be severed by a manual action in order for the selector lever to be able to move freely.

SUMMARY OF THE INVENTION

The basic object of the present invention is therefore to make available a shift-by-wire shifting device for an automatic transmission, which makes it possible, on the one hand, to reliably engage and disengage the parking brake, but, on the other hand, it does not have any disturbing mechanical forces during the movement of the selector lever in all positions outside the P position, and a simple pivoting movement of the selector lever shall be sufficient for the deactivation of the parking brake and for the uncoupling of the parking brake from the selector lever during normal operation.

According to the invention, a shifting device is provided for the mechanical coupling-free transmission of shift commands to an automatic transmission of a motor vehicle (shift-by-wire shifting). The shifting device has at least one housing and/or one frame (i.e., a housing part), one selector lever for manually selecting shift commands for the transmission of the motor vehicle in at least one shift gate, wherein the selector lever can be moved manually into at least four positions (P, R, N, D) and is pivotable about at least one shift axis. Transmission devices are provided for the transmission of the shift commands without mechanical coupling to the transmission of the motor vehicle. A parking brake is provided that is activated in the P position, which locks at least one output shaft of the transmission. A mechanical coupling is provided between the selector lever (2) and the transmission of the vehicle. This mechanical coupling activates the parking brake exclusively and automatically when the selector lever is engaged in the P position and is automatically uncoupled from the selector lever when the selector lever is pivoted out (moved) beyond the adjacent position.

The inventor has recognized that the desired goal can be achieved by such a mechanical coupling from the selector lever to the transmission of the vehicle being designed such that it activates the parking brake exclusively and automatically when the selector lever is engaged in the P position and the selector lever is automatically uncoupled from the selector lever when the selector lever is pivoted beyond the adjacent position. As a result, the parking brake can be engaged and disengaged under all circumstances, i.e., independently from the presence of auxiliary energy or the functioning or non-functioning of the electric communication. This leads to a substantial increase in safety due to this shifting device. The limitation of the movement of the mechanically coupled components to an area around the P position of the selector lever eliminates the friction in the mechanical coupling, for example, the cable, and in the components belonging to it during the shifting in the other shift positions, as a result of which the shifting comfort is markedly increased.

Another advantage of this embodiment of a shifting device according to the present invention is that due to the low work consumed by friction, which is to be overcome, it is now also possible to use shift patterns with only a few locked positions, preferably P and X the other shift positions being actuated by tapping motions only. It is necessary for this that the restoring forces are not disturbed by other frictional forces of a cable connection that may otherwise occur.

This basic principle can be accomplished kinematically, e.g., by means of a multiple hinge in the connection between the selector lever and the mechanical coupling with the transmission. Reference is made to the fact that mechanical coupling is defined here, for example, as a cable or a linkage connection between the transmission and the shifting device.

This multiple hinge connection advantageously has exclusively hinge axes that are arranged in parallel to the shift axis of the selector lever, and the multiple hinge connection advantageously also has a hinge axis, which is preferably arranged between the other hinge axes and extends along a shifting gate contour, preferably in a shifting gate contour of the selector lever.

Due to the use of such a shifting gate contour in or at the selector lever, it is possible to design this contour such that no change in position takes place in the multiple hinge due to the movement of the selector lever in a certain range of movement of the selector lever, whereas at least one axis of the multiple hinge, preferably a central axis of the multiple hinge, is deflected when the P position is engaged, as a result of which the cable is moved and the parking brake is thus engaged.

Concerning the design of the shifting gate in the selector lever, it shall be pointed out that it is within the scope of the present invention if the shifting gate is designed, on the one hand, as a correspondingly shaped slot in the selector lever, but, on the other hand, the same action can also be achieved by an open contour of the shifting gate.

For a very simple design of the shifting device according to the present invention, provisions may be made for using a multiple hinge connection to only one fixed hinge axis mounted on the frame side or the housing side and a free hinge axis, which is connected to the cable or linkage, preferably directly, and which is guided in or at the shifting gate.

In a special embodiment of the shifting device, the multiple hinge has a rectilinear sliding pair mounted on the frame side or the housing side, and the rectilinear sliding pair is preferably arranged at the connection to the cable or linkage, and the pushing movement is preferably to bring about activation or deactivation of the parking brake.

It is proposed in another special embodiment that the multiple hinge connection of the shifting device be designed with a lever hinge mounted on the frame side or the housing side at the connection to the cable or linkage, in which case the movement of a lever is to bring about a pushing movement at the cable and consequently the activation or deactivation of the parking brake.

Furthermore, a special embodiment of the multiple hinge connection of the shifting device has a hinge, preferably a hinge arranged at the end, which is mounted on the frame side or on the housing side.

Corresponding to the design of the shift-by-wire shifting device, an electronic or optical detection device, which is preferably arranged in the area of the shift axis of the selector lever, is provided for positioning the selector lever. However, embodying the detection device in any other manner known from the state of the art to detect the positioning of the selector lever is also within the scope of the present invention.

The shifting device may additionally also have a spring-loaded cam, which directly or indirectly cooperates with the movement of the selector lever, so that simulation of shifting forces is achieved. It may also be advantageous here if at least two positions, e.g., P and X, are locked in a stable manner and at least two positions, e.g., R, N, D and optionally + and −, are designed as positions that can be tapped in an unstable manner only.

If the shifting device is designed not only as a simple automatic shifting device, but shall also assume additional functions, for example, that of a Tiptronic, the inventor proposes that the selector lever is additionally mounted, indirectly or directly, about a selector axis arranged at right angles to the shift axis, in which case the frame may also be mounted such that it is movable about this selector axis. It is obvious in case of such an embodiment that an additional outer frame or an outer housing is provided, in which the entire shifting device is then mounted.

It is advantageous here if the connection between the cable or linkage and the multiple hinge has a hinge, whose axis extends in parallel to and preferably coaxially with the selector axis. This hinge connection will make possible the free movement of the selector lever about the selector axis without leading to an interference by the linkage or the cable.

In another type of this embodiment of the shifting device with a plurality of preferably parallel shift gates, the selector lever may also be designed as a selector lever that is split at the level of the selector axis, so that only the upper part of the selector lever is made pivotable about the selector axis and the lower part of the selector lever is mounted pivotably about the shift axis.

Furthermore, it is advantageous to equip the part of the selector lever that is pivotable about the selector axis with spring-loaded resetting devices, preferably a resetting spring, so that automatic resetting into a predetermined position takes place.

Furthermore, it is within the scope of the present invention if a spring-loaded cam for simulating shifting forces is provided for moving the selector lever about the selector axis.

Other features and advantages of the present invention will appear from the subclaims and the following description of preferred exemplary embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
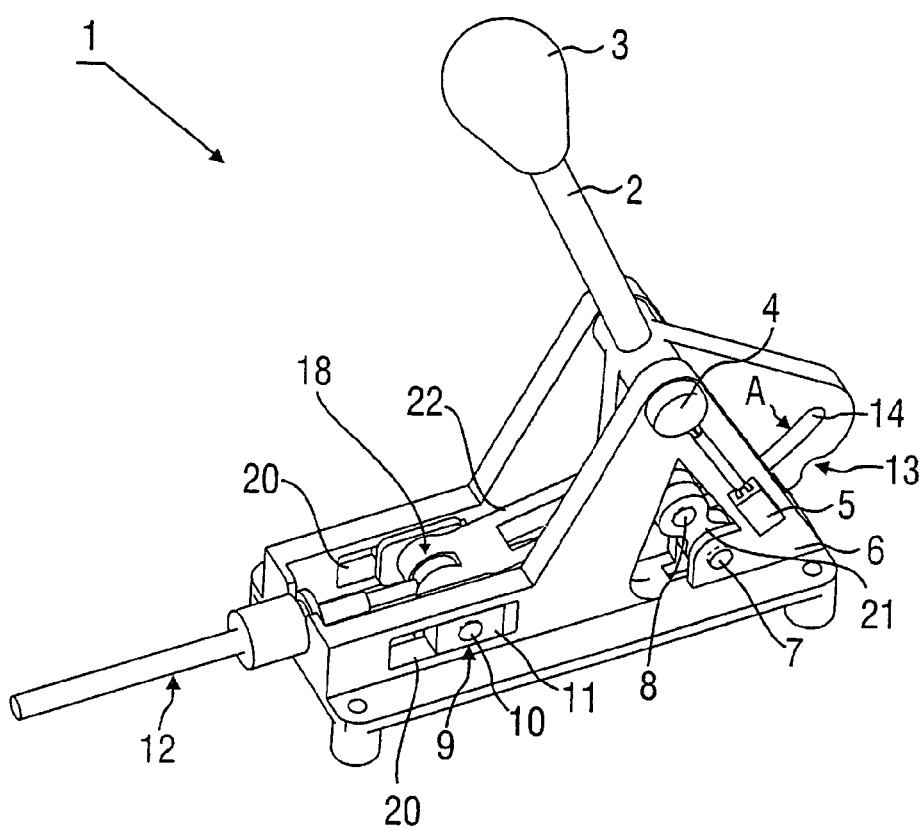
FIG. 1 is a perspective (3-D) view of a first exemplary embodiment of the shifting device according to the present invention with a rectilinear sliding pair.
Figure 2:
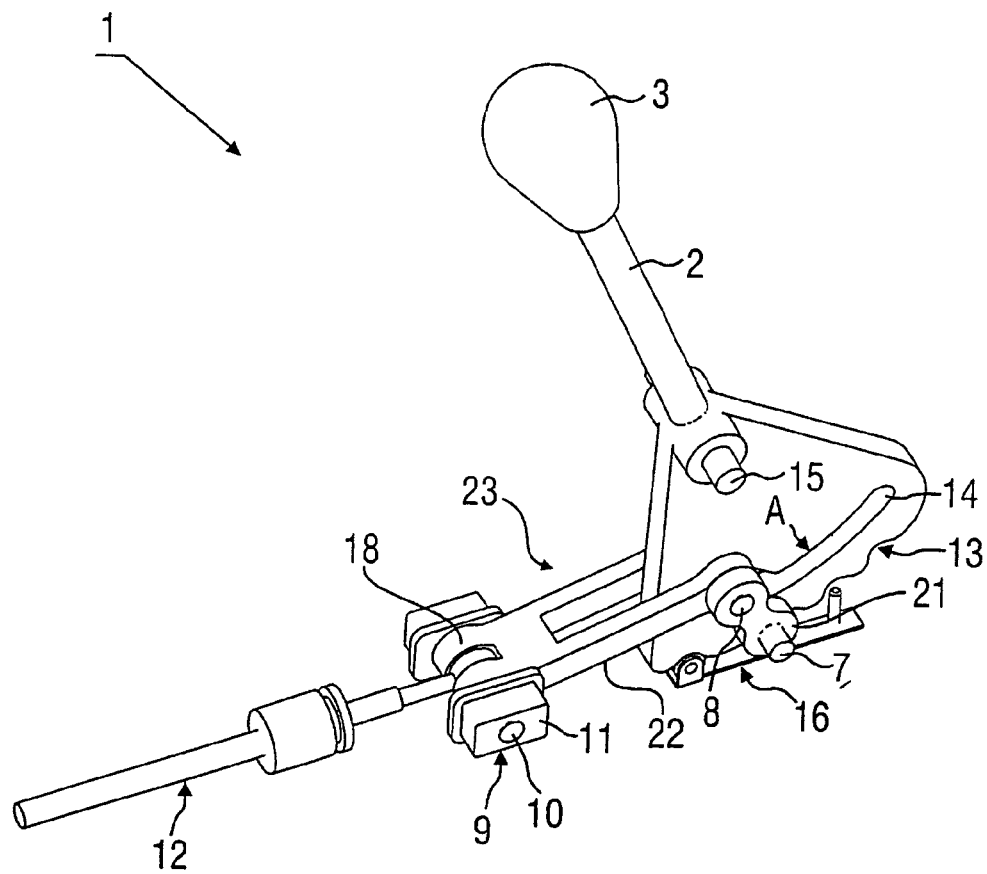
FIG. 2 is a perspective view of a portion of the first exemplary embodiment of the shifting device according to the present invention.

Referring to the drawings in particular, FIGS. 1 through 13 show a preferred embodiment of the shifting device according to the present invention in different views and detail views for different shift positions of the selector lever.

FIGS. 1 through 5 show the shifting device 1 with the selector lever position "P." FIGS. 6 through 9 show the selector lever position "R" and FIGS. 10 through 13 show the selector lever position "D."

The complete shifting device according to this embodiment of the present invention can be best recognized from the 3D oblique view. It shows the shifting device 1 with a selector lever 2, which is mounted pivotably about a shift axis 15 and has a knob 3 at the upper part of the selector lever, while the lower side of the selector lever is guided flatly and approximately as a circle sector in the plane of movement. The lower circle sector of the selector lever 2 has a shifting gate slot 14 and a cam 13 located on the edge side for simulating shifting forces. Corresponding to the property of the shift-by-wire shifting device, a sensor system 4, which can detect the corresponding shift positions of the selector lever 2 and transmits these shift commands to the vehicle or the transmission of the vehicle via a plug-in connection 5, which acts as an electric interface, is located in the area of the shift axis 15.

However, despite the shift-by-wire design of the shifting device, there is a mechanical coupling according to the present invention with the gearbox, and this connection is embodied here in the form of a cable 12.

The cable 12 is activated via a rectilinear sliding pair 9 by a pushing motion taking place there, the rectilinear sliding pair 9 being designed as a displaceable sliding pair on two sides of the frame 6 with slides 11 in elongated holes 20, and the slides 11 in turn act as mounts for the axis of rotation 10 of the rectilinear sliding pair 9.

A hinge piece 21 is likewise mounted in the frame by means of a hinge axis 7, and this hinge piece has a free hinge axis 8 at the second free end, in which a second hinge piece 22 is in turn mounted rotatably about the hinge axis 8. The other end of the hinge piece 22 is in turn mounted with the displaceable axis of rotation 10 in the slides 11. On the whole, this construction of the hinge pieces and hinge axes described forms the multiple hinge according to the present invention, the free hinge axis 8 passing through the elongated hole shifting gate 14 of the selector lever 2. Corresponding to the movements of the selector lever 2 and the shape of the elongated hole shifting gate in space, raising and lowering or a phase of rest of the free hinge axis 8 is brought about, so that a pushing or pressing can be exerted on the cable 12 corresponding to the shown mechanical coupling with the cable 12.

FIG. 2 shows once again, in the same view, the selector lever 2 including the multiple hinge 23 and the cable connected therewith, but without frame. The spring system 16, comprising a leaf spring with roller, which extends in the cam 13, can be recognized here especially clearly. The shifting forces, which are not otherwise present, are simulated by this spring system for the driver in the manner known per se.

Figure 3:
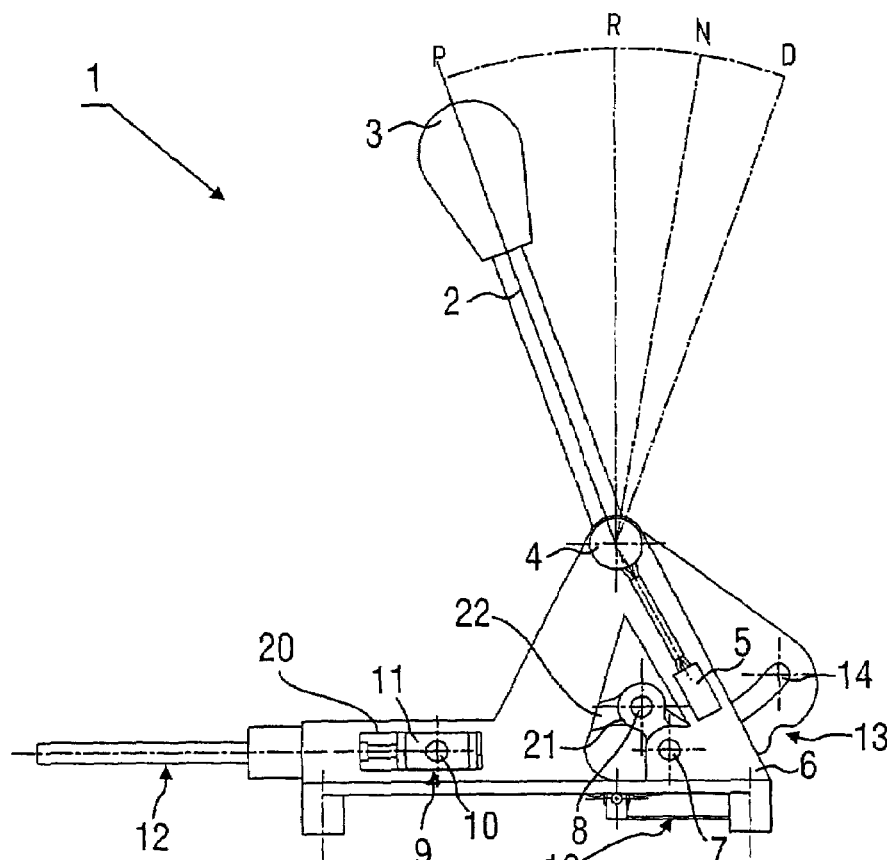
FIG. 3 is a side view of the first exemplary embodiment of the shifting device according to the present invention.
Figure 4:
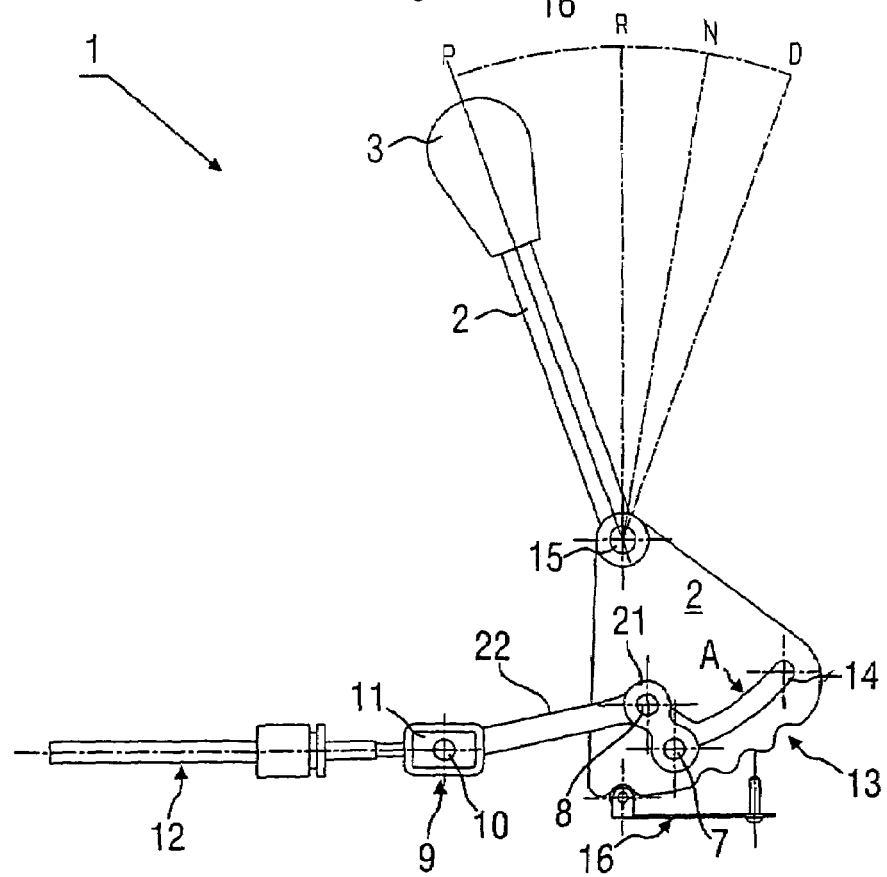
FIG. 4 is a side view of the portion of the first exemplary embodiment of the shifting device shown in FIG. 2.

A side view of the views from FIGS. 1 and 2 is shown once again in FIGS. 3 and 4, and the possible shift positions P, R, N, D of this special embodiment are additionally shown schematically.

Figure 5:
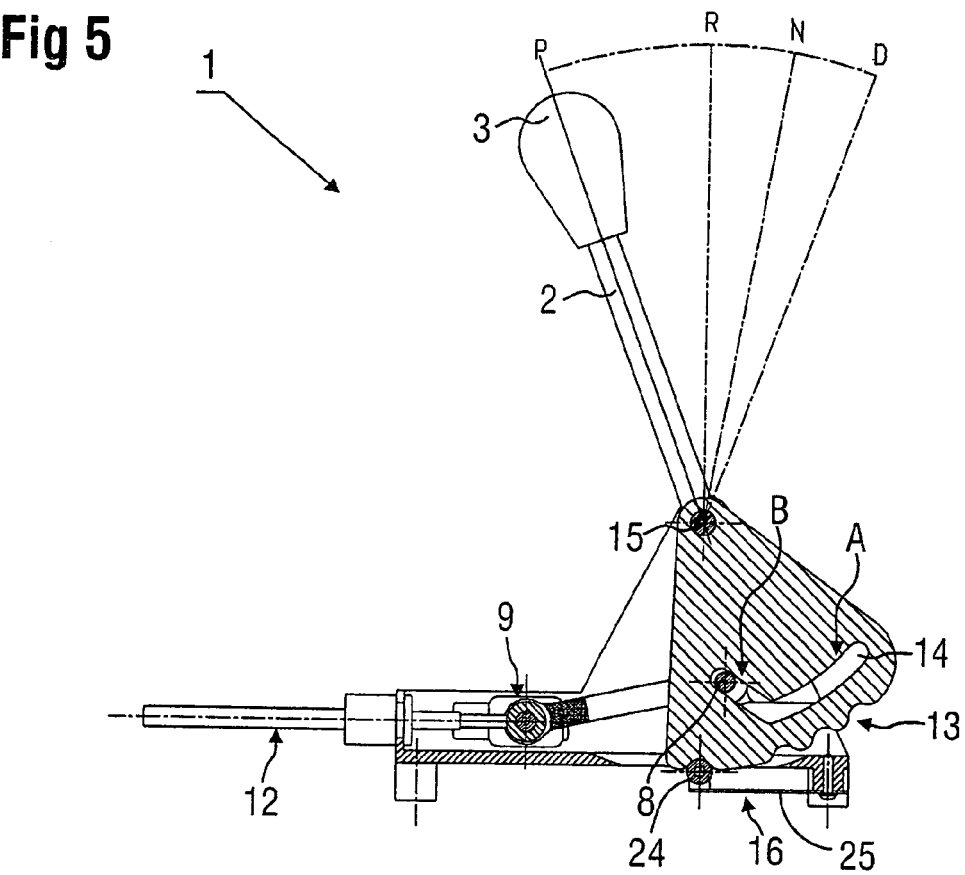
FIG. 5 is a sectional view of the first exemplary embodiment of the shifting device according to the present invention.
Figure 6:
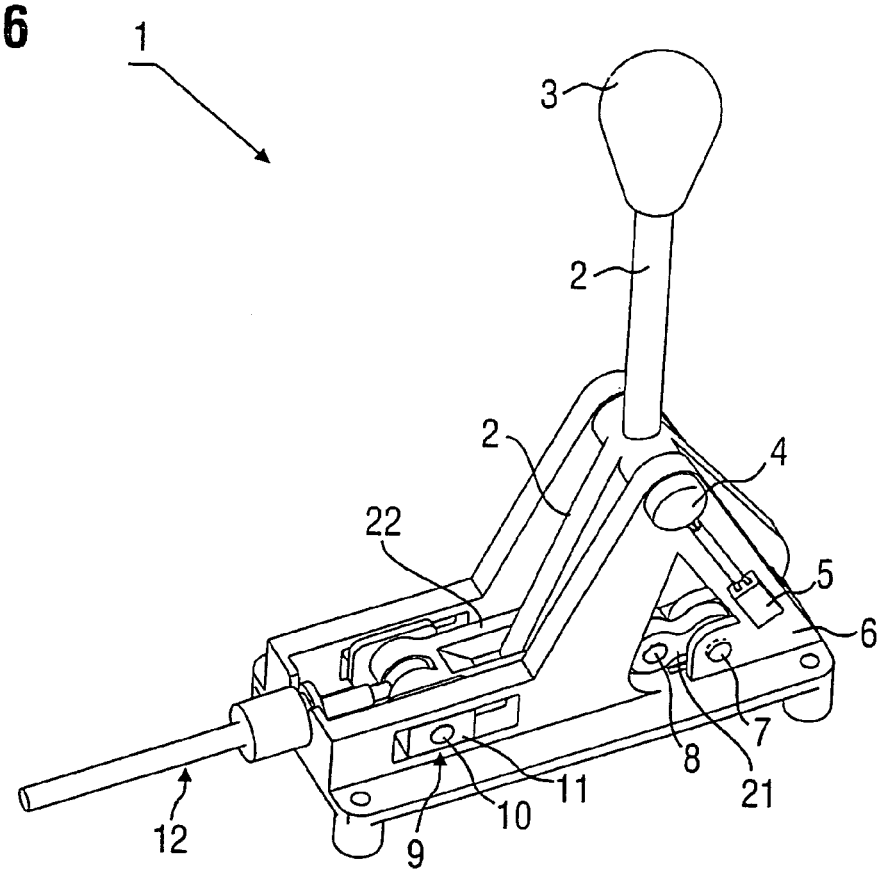
FIG. 6 is a perspective view of the first exemplary embodiment of the shifting device according to the present invention showing a selector lever position different from FIG. 1.
Figure 7:
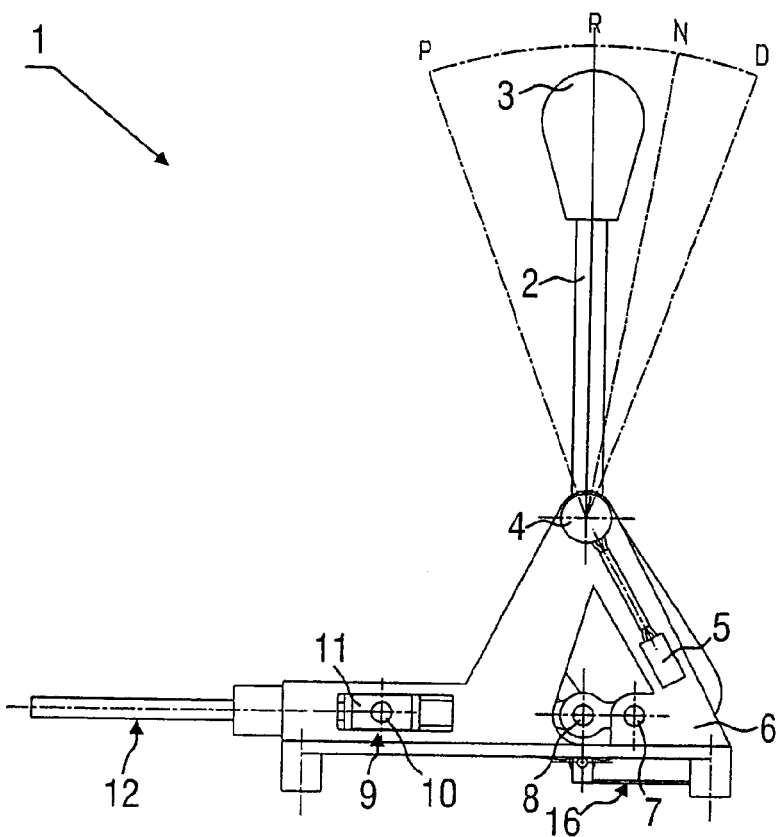
FIG. 7 is a side view of the first exemplary embodiment of the shifting device according to the present invention showing a selector lever position different from FIG. 3.
Figure 8:
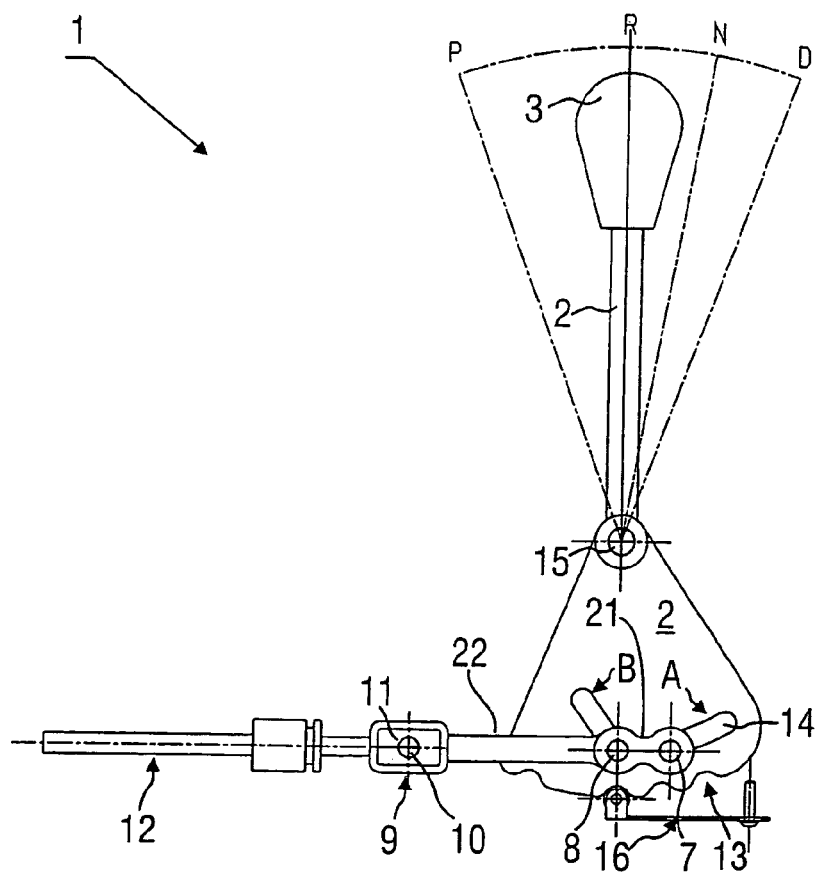
FIG. 8 is a side view of a portion of the first exemplary embodiment of the shifting device according to the present invention showing a selector lever position different from FIG. 4.
Figure 9:
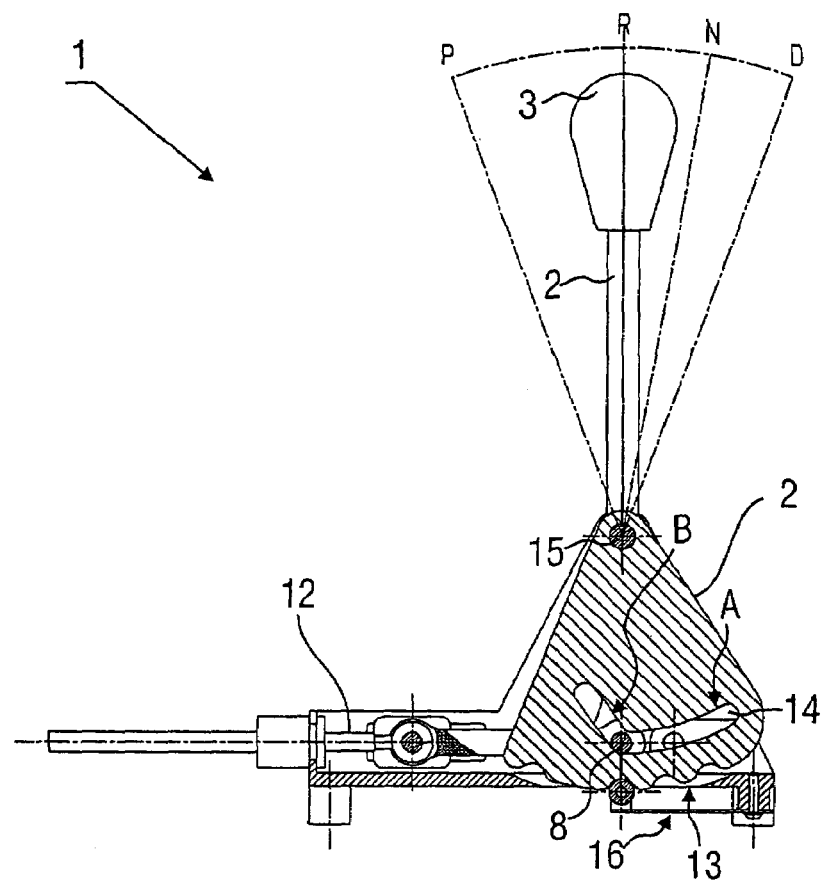
FIG. 9 is a sectional view of the first exemplary embodiment of the shifting device according to the present invention showing a selector lever position different from FIG. 5.
Figure 10:
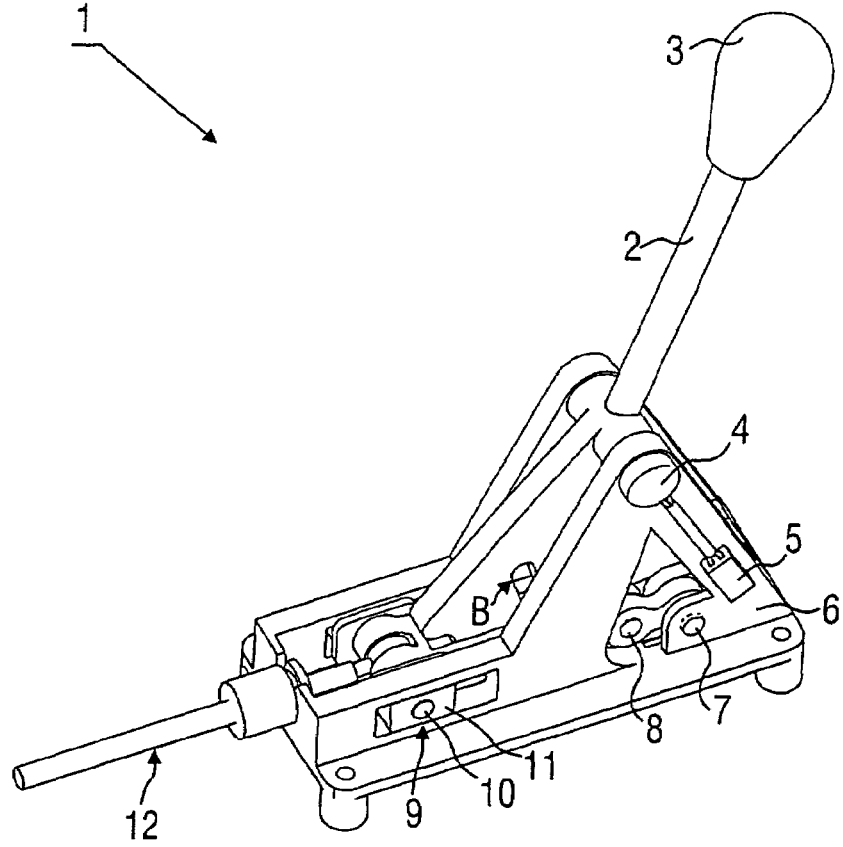
FIG. 10 is a perspective view of the first exemplary embodiment of the shifting device according to the present invention showing a selector lever position different from FIG. 6.
Figure 11:
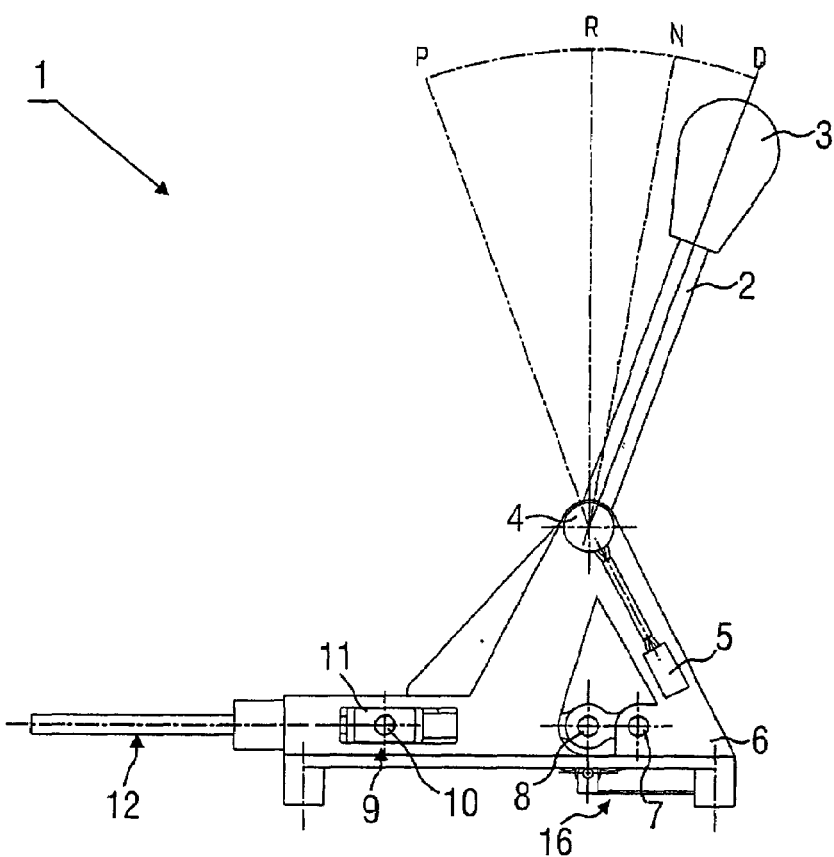
FIG. 11 is a side view of the first exemplary embodiment of the shifting device according to the present invention showing a selector lever position different from FIG. 7.
Figure 12:
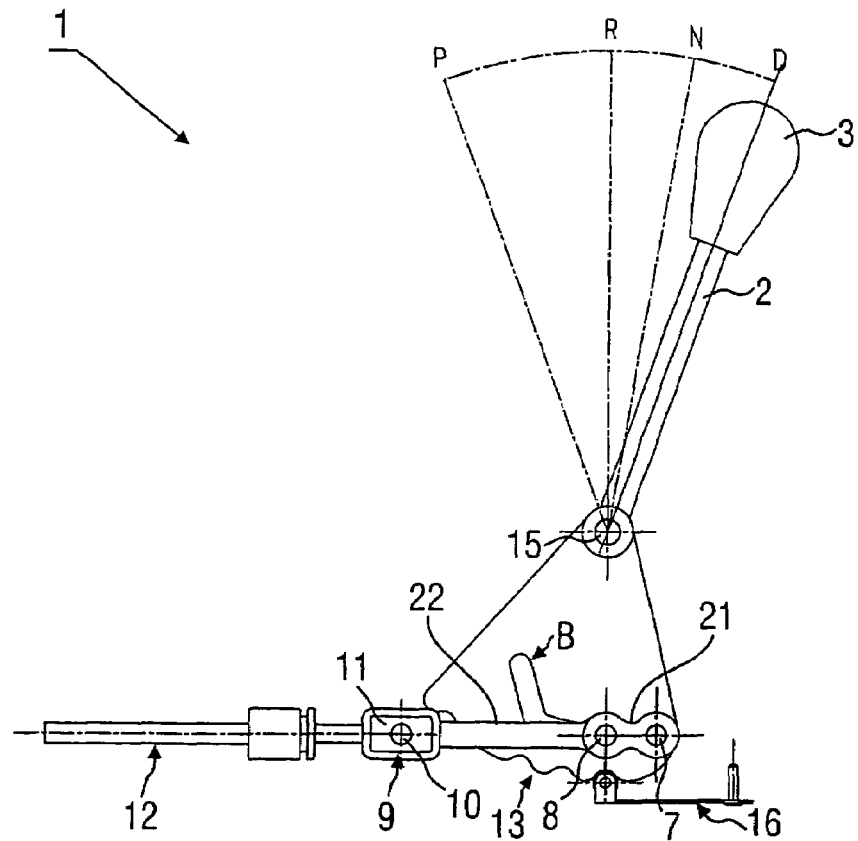
FIG. 12 is a side view of a portion of the first exemplary embodiment of the shifting device according to the present invention showing a selector lever position different from FIG. 8.
Figure 13:
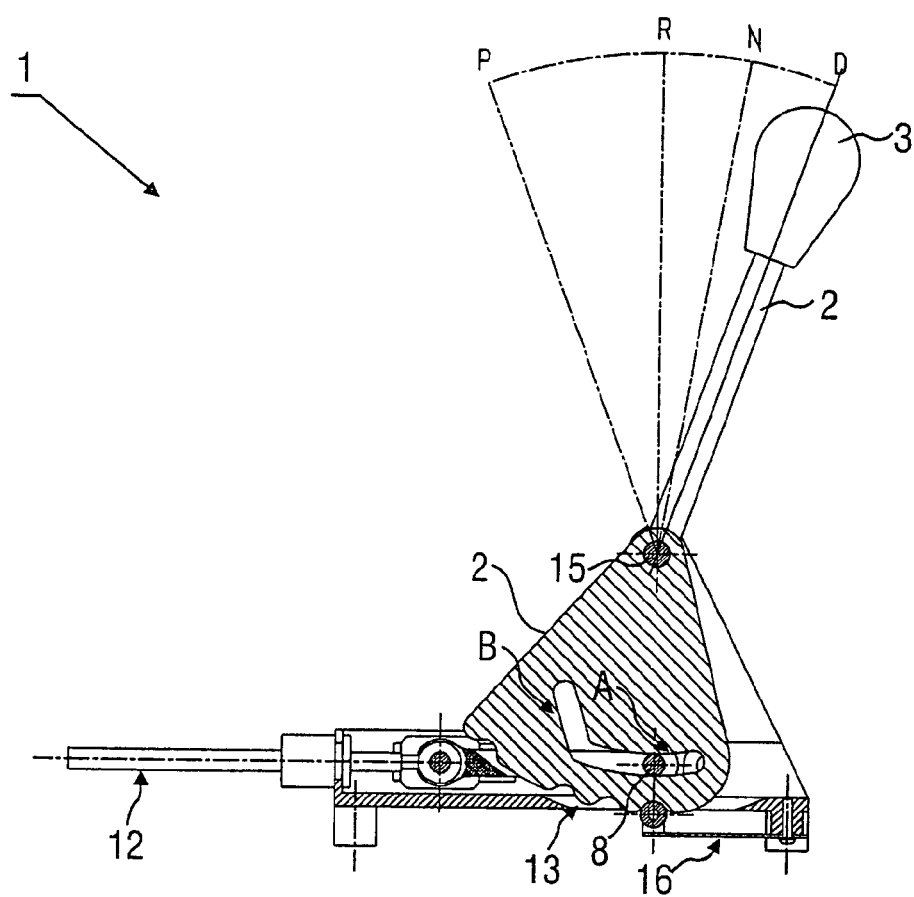
FIG. 13 is a sectional view of the first exemplary embodiment of the shifting device according to the present invention showing a selector lever position different from FIG. 9.
Figure 14:
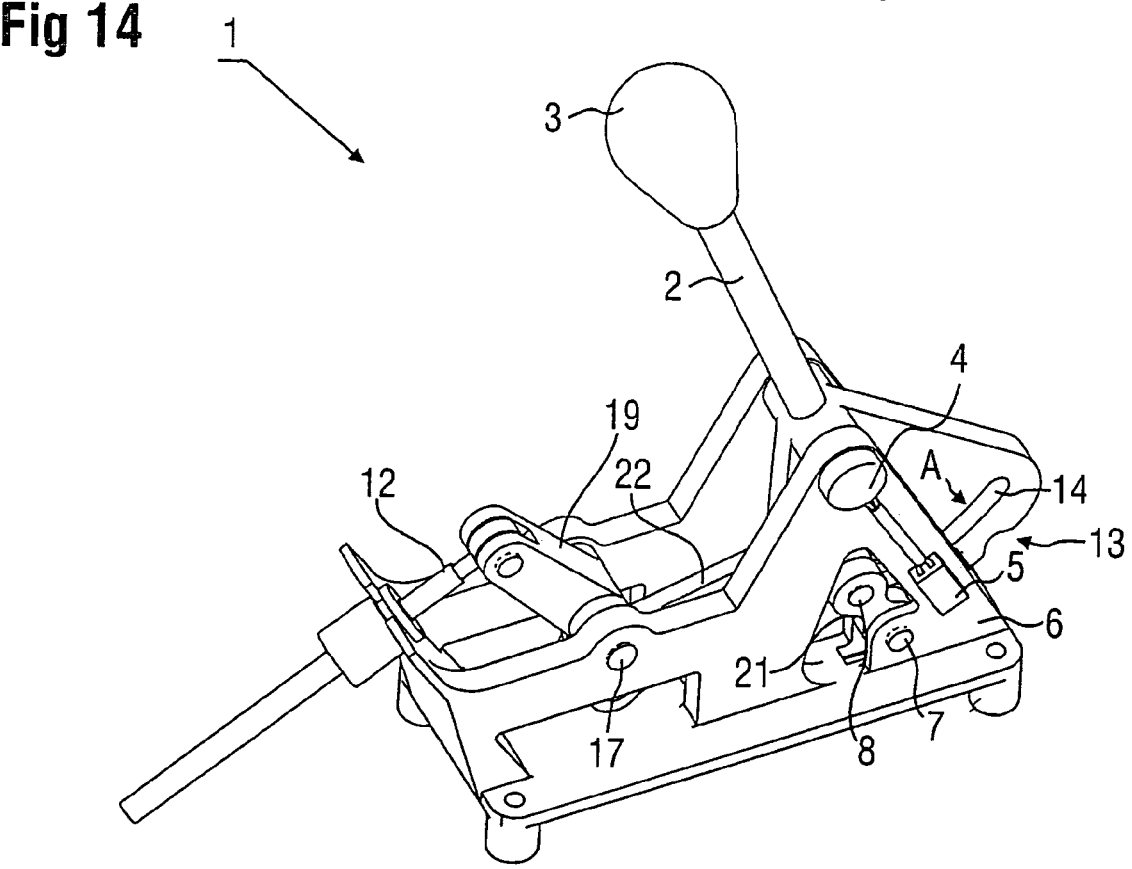
FIG. 14 is a perspective view of a second exemplary embodiment of the shifting device according to the present invention with a lever hinge instead of the rectilinear sliding pair, showing a selector lever in the shift position "P;"
Figure 15:
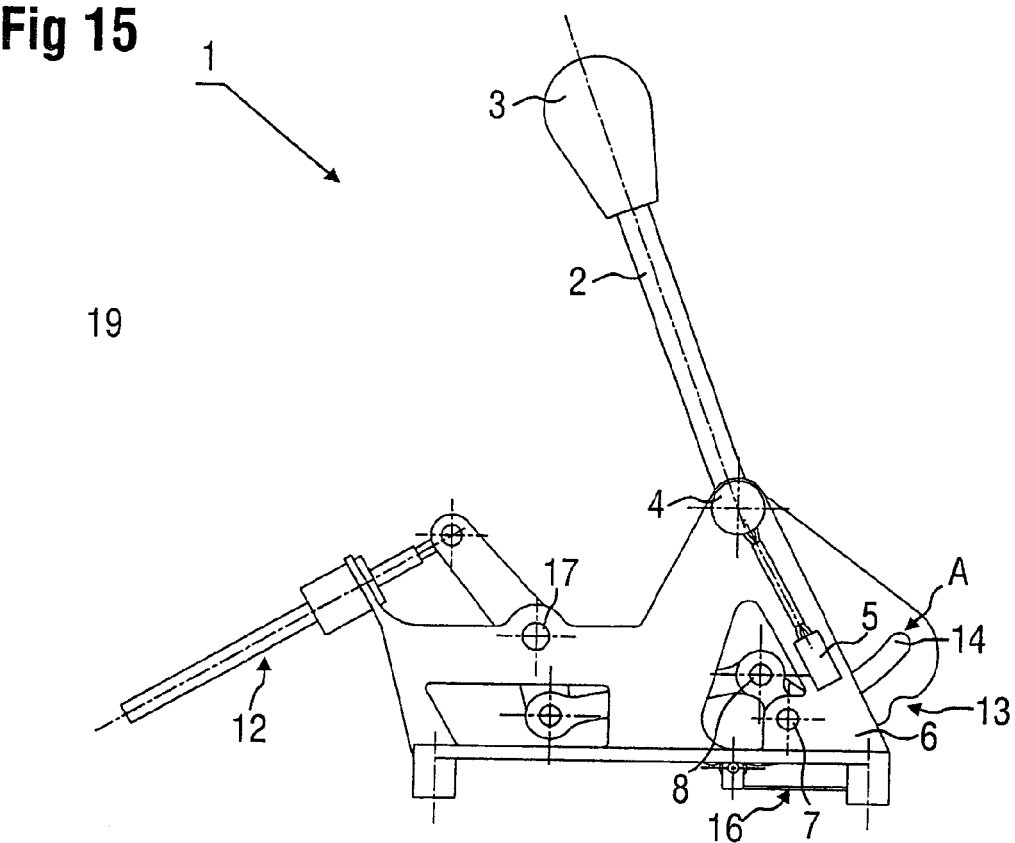
FIG. 15 is a side view of the second exemplary embodiment of the shifting device according to the present invention with a lever hinge instead of the rectilinear sliding pair, showing a selector lever in the shift position "P;"
Figure 16:
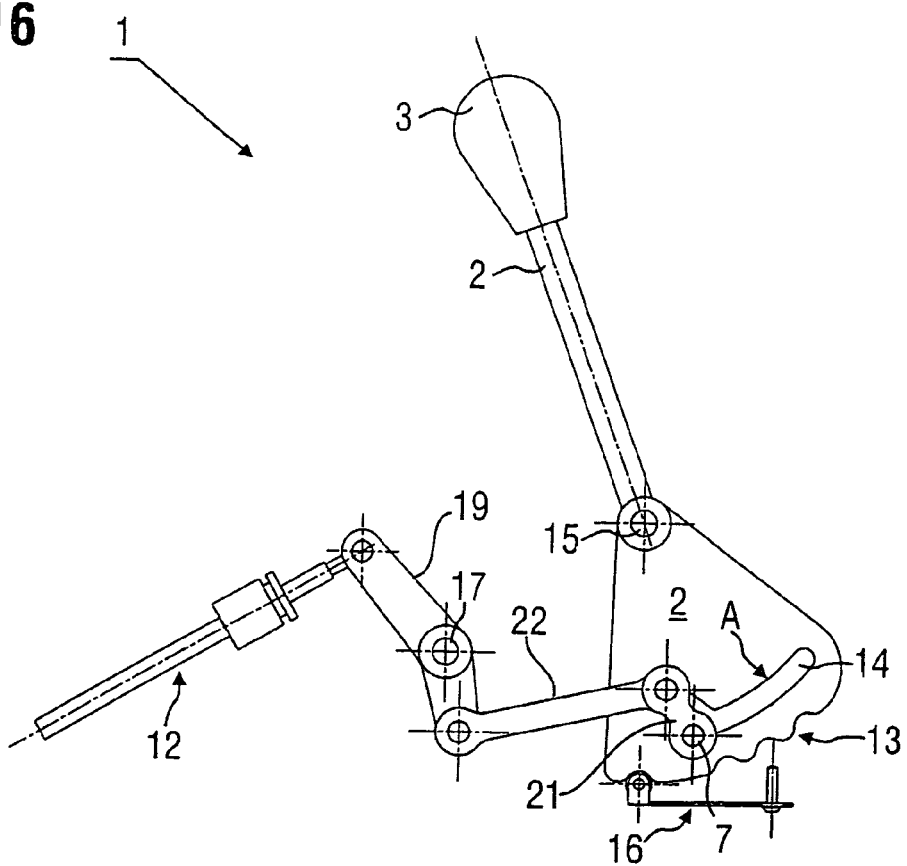
FIG. 16 is a side view of a portion of the second exemplary embodiment of the shifting device according to the present invention with a lever hinge instead of the rectilinear sliding pair, showing a selector lever in the shift position "P;"
Figure 17:
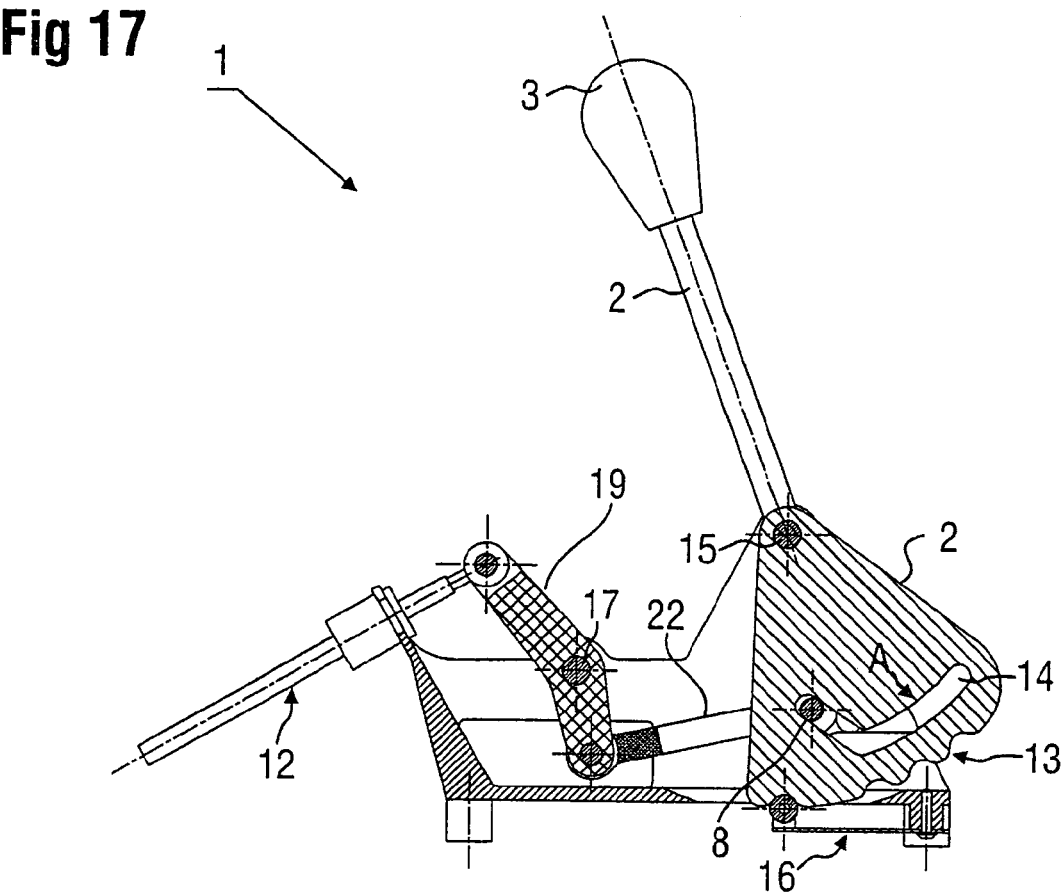
FIG. 17 is a sectional view of the second exemplary embodiment of the shifting device according to the present invention with a lever hinge instead of the rectilinear sliding pair, showing a selector lever in the shift position "P;"

FIG. 5 shows a longitudinal section through FIG. 1 in the plane of the lever arm, so that the shape of the elongated hole shifting gate 14 can be recognized here especially clearly. This elongated hole shifting gate 14 has a first shifting gate area, which represents a circle segment, which extends concentrically about the shift axis 15 of the selector lever, so that pivoting of the selector lever by this angle range does not lead to any movement for the free axis 8. Furthermore, the linear area B of the shifting gate can be recognized, which intersects an imaginary circle about the shift axis 15, whose circular curve is congruent with the shifting gate area A. If the free axis 8 is located in this area B of the shifting gate, which does not, however, absolutely have to be linear according to the present invention, pivoting of the selector lever 2 leads to raising of the free axis 8 and consequently to a displacement of the rectilinear sliding pair 9 of the multiple hinge 23. Corresponding to the embodiment of the angle of intersection between the linear area B of the shifting gate and the circular area A of the shifting gate, the pivoting movement of the selector lever 2 between the positions R and P will lead to different pushing actions in the rectilinear sliding pair 9 and consequently in the cable 12.

FIGS. 6 through 9 show, in the same order, the same views of the preferred embodiment of the shifting device according to FIGS. 1, 3, 4 and 5, but the selector lever 2 is in the R position and the free hinge axis 8 is correspondingly located at the intersection between the two shifting gate areas A and B. Linear stretching of the multiple hinge 23 is achieved in this position, so that the hinge axes 7, 8 and 9 extend in one line and maximum stretching of the multiple hinge 23 is thus generated, which leads to a maximum pushed-in position of the cable 12. This corresponds to the release of the parking brake, so that free movement of the output shaft of the coupled gearbox is made possible starting from this position.

The views in FIGS. 10 through 13 correspond to those in FIGS. 6 through 9 of the preferred embodiment of the shifting device according to the present invention, but in FIGS. 10 through 13 the selector lever is in the shift position D. Since the free hinge axis 8 of the multiple hinge is in the circularly curved shifting gate area B of the elongated hole shifting gate over this range of deflection between R and D, this axis 8 is not subject to any movement over this range of pivoting, so that no forces can act with the exception of the frictional forces, which can be made very weak and are due to the mechanical coupling between the shifting device and the gearbox for the parking brake.

FIGS. 14 through 17 show another embodiment of the shifting device 1 with multiple hinge for actuating the parking brake, which is likewise within the framework of the present invention. However, a lever hinge is used here instead of the connection to the cable by a rectilinear sliding pair.

The views in the figures correspond to those in FIGS. 1, 3, 5 and 6 of the preferred embodiment.

A lever hinge, which has a two-armed lever arm 19, which is mounted rotatably in the frame 6 via a hinge axis 17, is used instead of the rectilinear sliding pair. The second hinge piece 22 acts on the lower side of the lever hinge via an axis of rotation 10, so that kinking of the multiple hinge 23 causes pivoting of the lever hinge 19 analogously to the displacement of the rectilinear sliding pair and the cable 12 acting at the other end of the lever hinge 19 is moved correspondingly. The fastening between the cable 12 and the lever hinge 19 is embodied in this embodiment by an axis of rotation 18, so that the twisting between the lever hinge 19 and the cable can be compensated during a pushing movement of the cable.

Concerning the mechanical action of the multiple hinge, reference can be made to FIGS. 1 through 13, because these are basically identical. Also, only a P position of the selector lever is shown for this reason.

FIGS. 18 through 24 show another, simplified embodiment of the shifting device according to the present invention with a double hinge as a coupling between the selector lever 2 and the cable 12.

Figure 18:
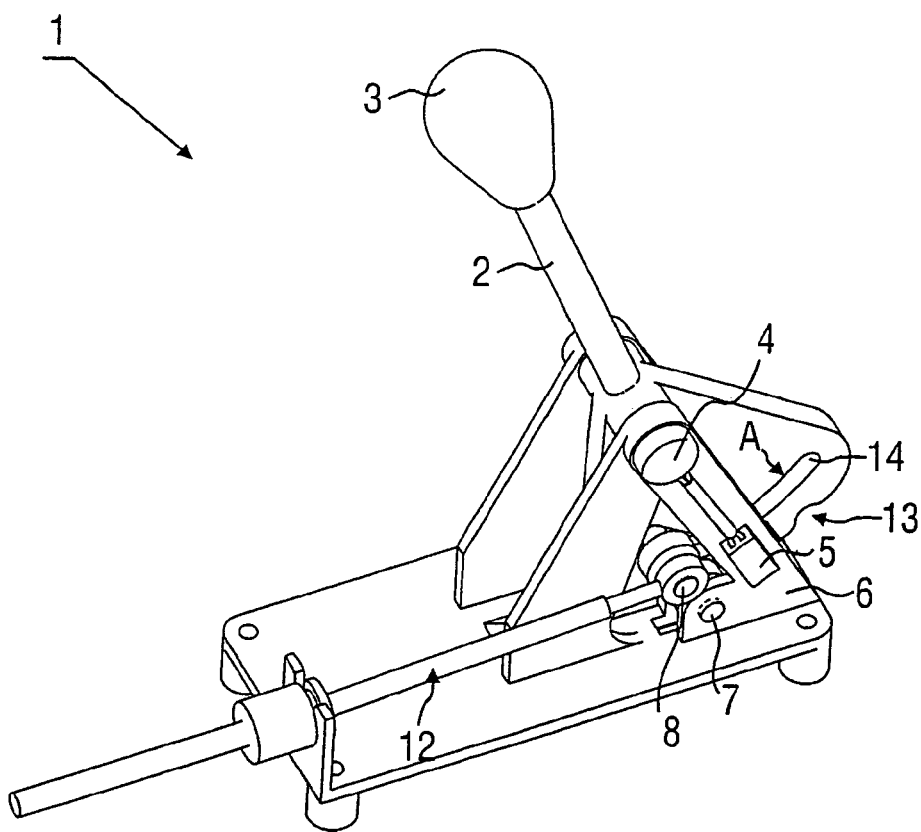
FIG. 18 is a perspective view of a third exemplary embodiment of the shifting device according to the present invention with a double hinge, showing a selector lever in the shift position "P;"
Figure 19:
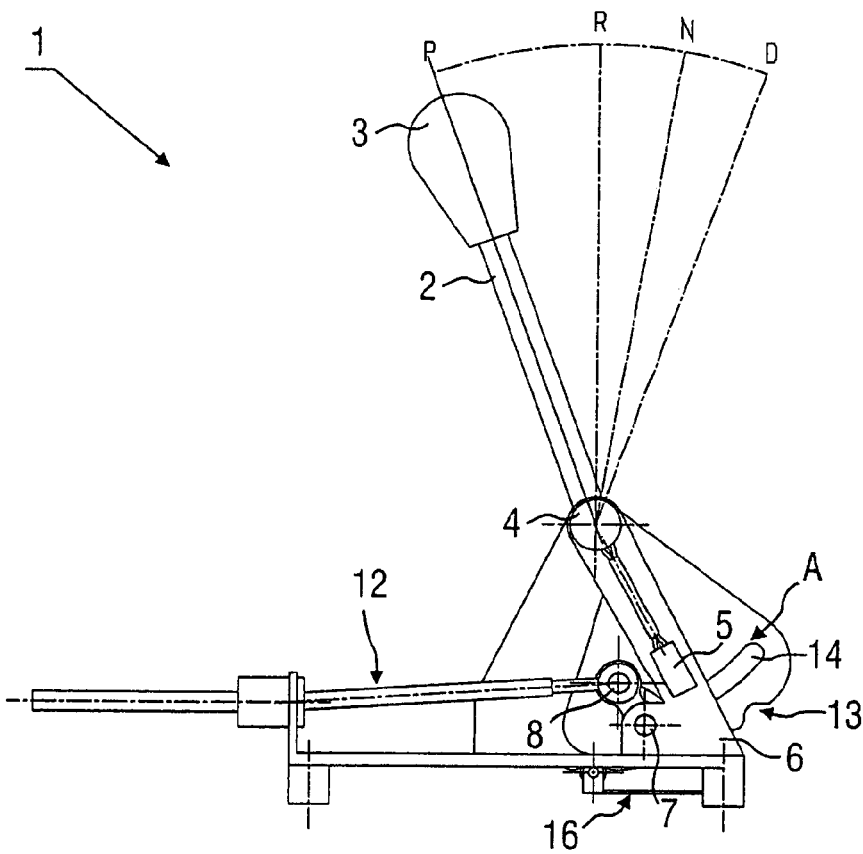
FIG. 19 is a side view of the third exemplary embodiment of the shifting device according to the present invention with a double hinge, showing a selector lever in the shift position "P;"

FIGS. 18 and 19 show the shifting device 1 with a selector lever 2 each in the P position in a 3D view and in a side view. It can be recognized in both figures that the first fixed pivot axis 7 is mounted in the frame 6, while the second, free pivot axis 8 is used as a connection to the cable 12, on the one hand, and is guided in the shifting gate 14 with the two different shifting gate sections A and B, on the other hand. The fixed pivot axis 7 and the free pivot axis 8 are connected to one another by the only hinge piece 21.

Figure 20:
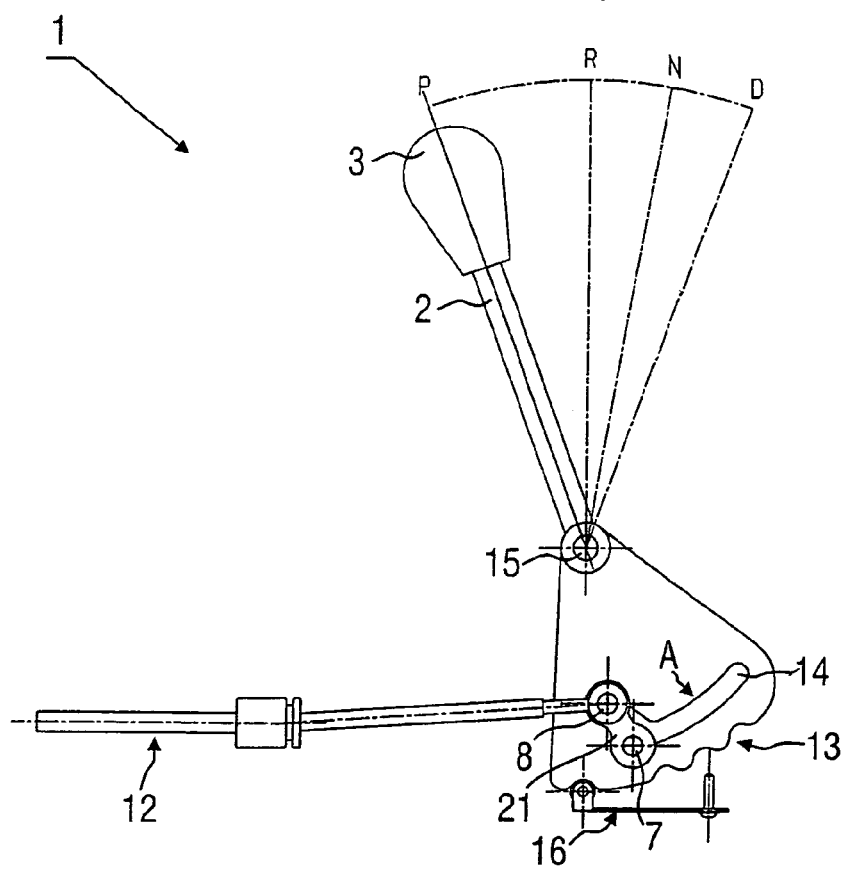
FIG. 20 is a side view of a portion of the third exemplary embodiment of the shifting device according to the present invention with a double hinge, showing a selector lever in the shift position "P;"

FIG. 20 shows, to illustrate the locking in the lower area of the shifting device, a side view of the selector lever 2, including the cable 12 and the spring system 16 for locking the selector lever with the corresponding cam 13, which spring system is shown in the above-described figures.

Figure 21:
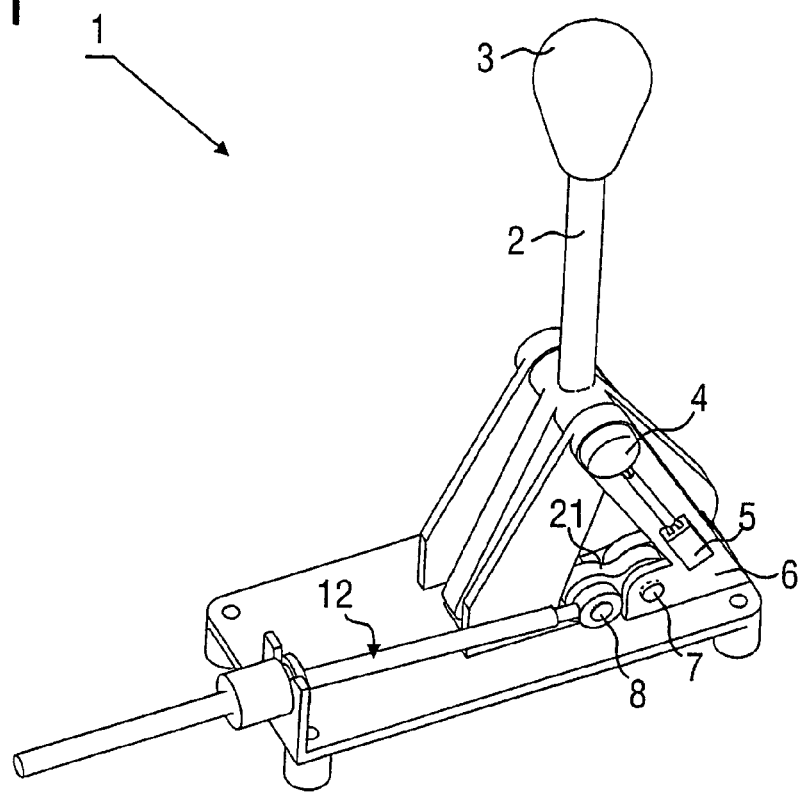
FIG. 21 is a perspective view of the third exemplary embodiment of the shifting device according to the present invention with a double hinge, showing a selector lever in the shift position "R;"
Figure 22:
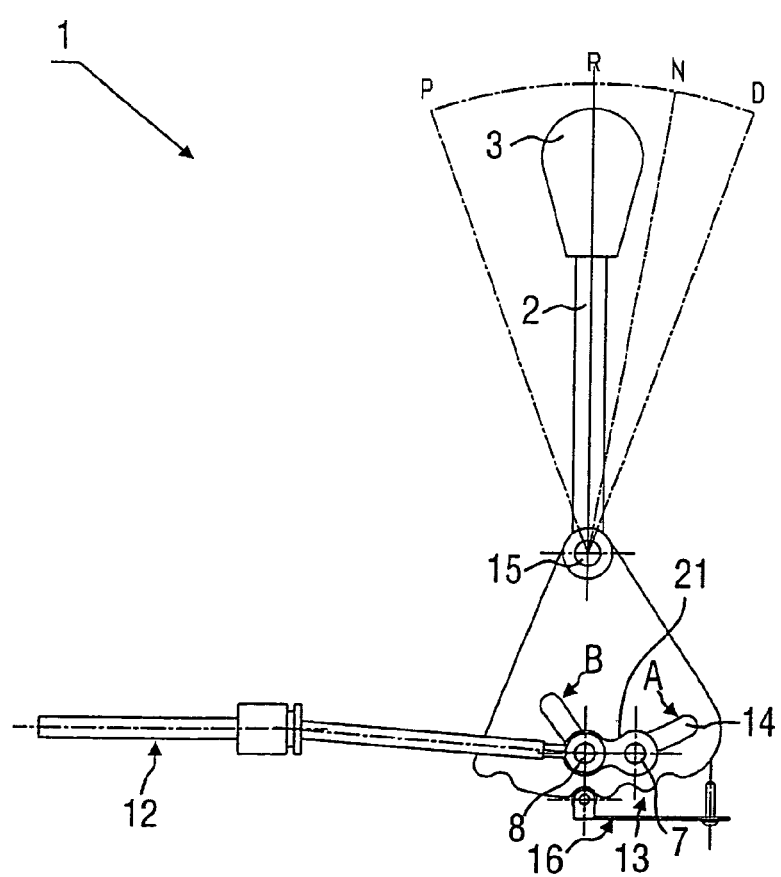
FIG. 22 is a side view of a portion of the third exemplary embodiment of the shifting device according to the present invention with a double hinge, showing a selector lever in the shift position "R;"
Figure 23:
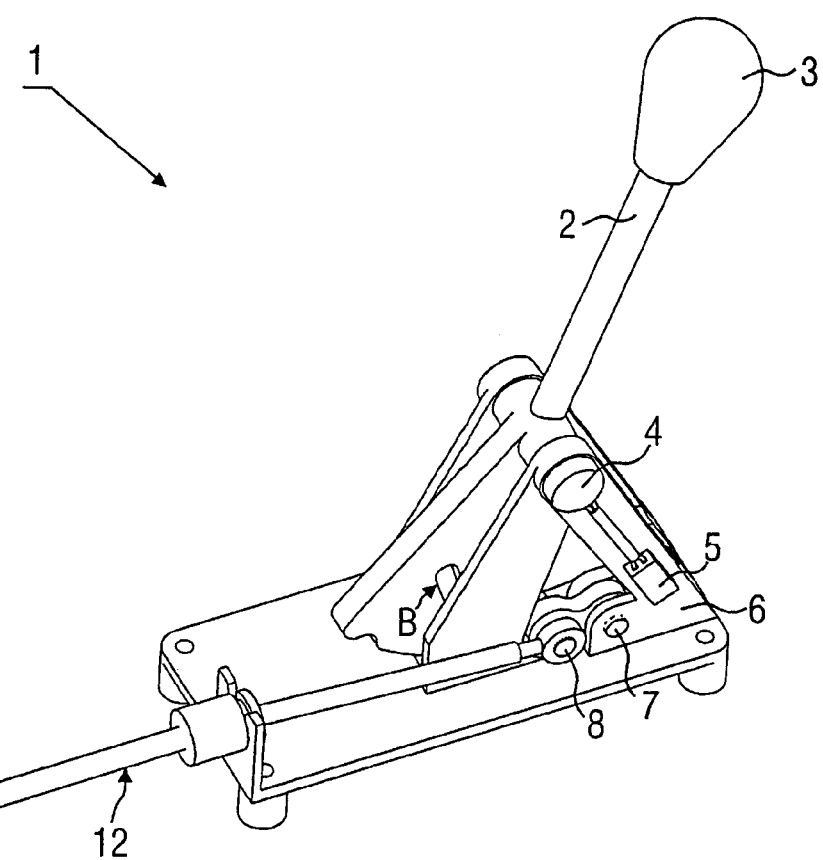
FIG. 23 is a perspective view of the third exemplary embodiment of the shifting device according to the present invention with a double hinge, showing a selector lever in the shift position "D;"
Figure 24:
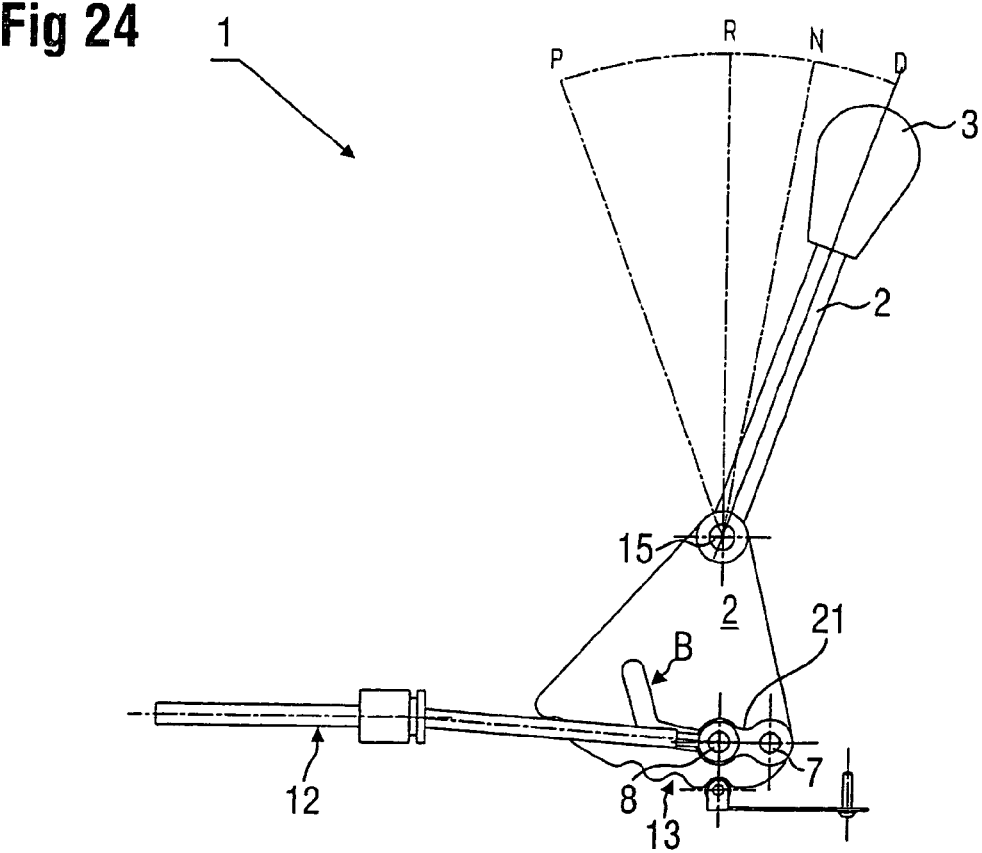
FIG. 24 is a side view of a portion of the third exemplary embodiment of the shifting device according to the present invention with a double hinge, showing a selector lever in the shift position "D;"

FIGS. 21 and 22 show this simple embodiment of the shifting device with a selector lever in the R position in a 3D view and in a side view. It can be clearly recognized especially from the side view that the free hinge axis 8 is located precisely in the intersection between the curved shifting gate section A and the linearly rising shifting gate section B in this position of the selector lever. If the selector lever is pivoted farther from this position in the direction of the D position, free movement will be obtained concerning the coupling with the cable 12 and consequently with the parking brake.

Corresponding to FIGS. 21 and 22, FIGS. 23 and 24 show once again the shifting device, but the selector lever 2 is in the D position. It can be recognized that the free pivot axis 8 has remained completely stationary in relation to the R position of the selector lever 2 and consequently it has not brought about any movement of the cable 12 between the positions R and D.

The two embodiments shown before illustrate the embodiment of the mechanical coupling of the parking brake based on the example of a shifting device with a single shift gate. However, it is pointed out that it is also within the scope of the present invention to extrapolate this type of coupling of the parking brake with the selector lever to a shifting device that has a plurality of shift gates by designing the device shown or at least a selector lever arm such that it is laterally pivotable via a selector axis, which is preferably arranged at right angles to the shift axis. It may be advantageous in this case to design the fastening of the cable as a rotatable fastening corresponding to the longitudinal direction of the cable, and the cable should be preferably arranged in parallel to and especially coaxially with the selector axis in this case.

Figure 25:
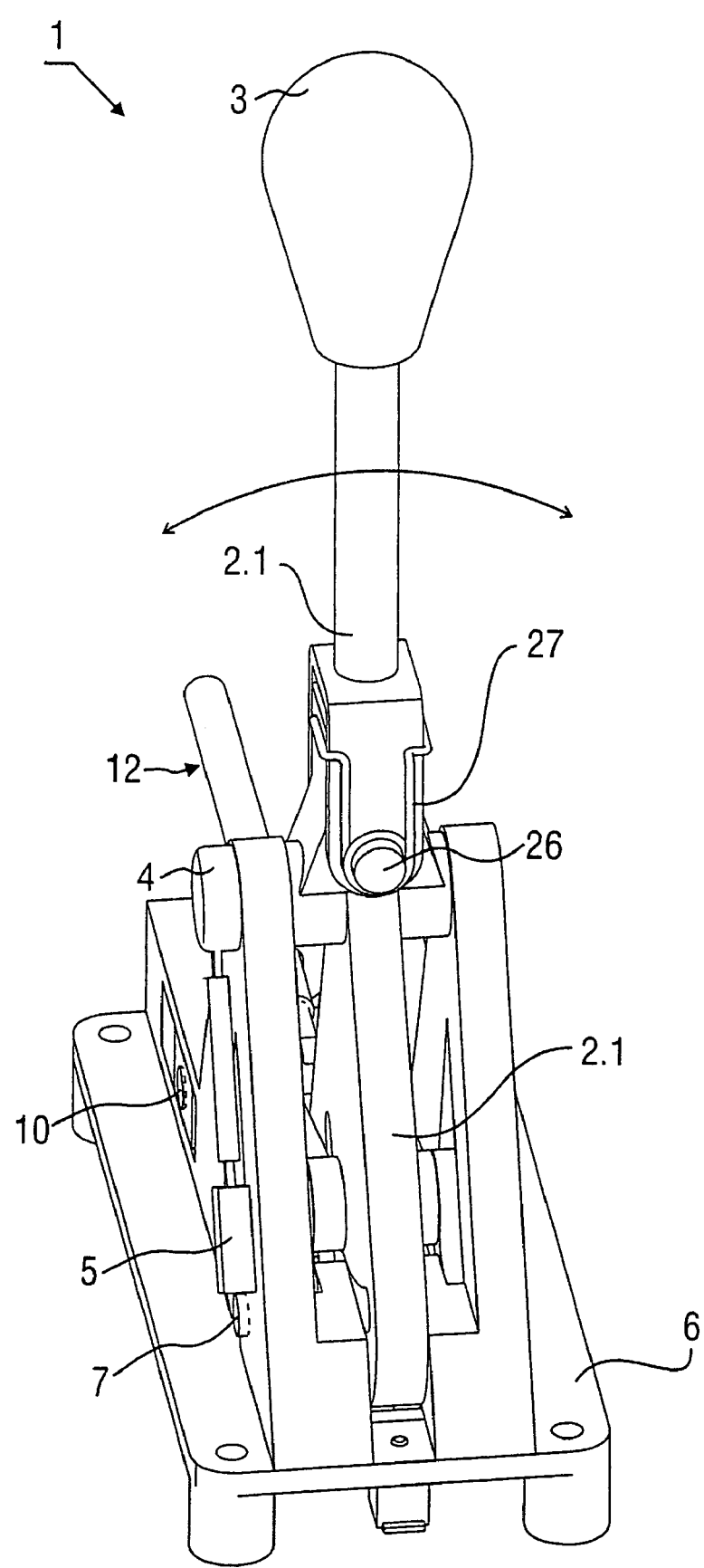
FIG. 25 is a perspective view showing a shifting device according to the present invention with the selector lever mounted such that it is pivotable about two axes in two selection positions.
Figure 26:
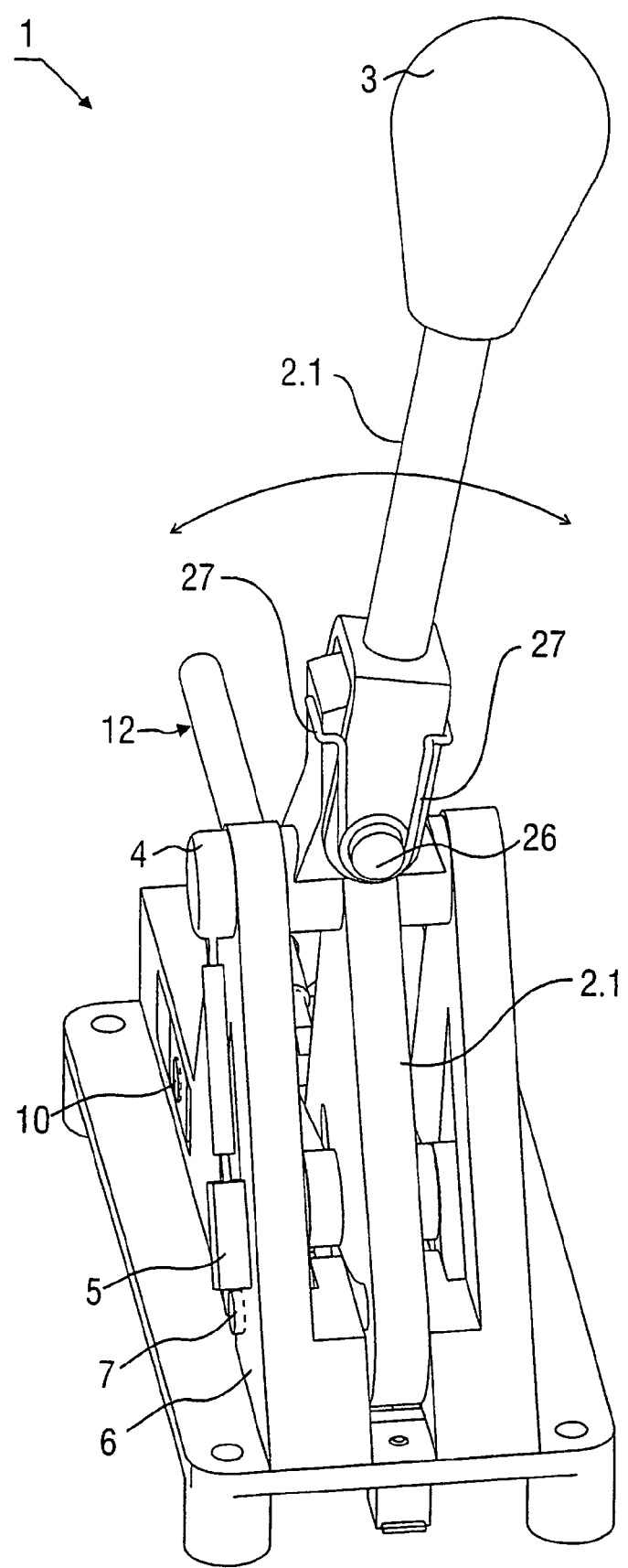
FIG. 26 is a perspective view showing a shifting device according to the present invention with the selector lever mounted such that it is pivotable about two axes in two selection positions and showing the selector lever pivoted about the second axis.

FIGS. 25 and 26 illustrate such a preferred embodiment of a shifting device with an existing selector axis. These figures show the shifting device in a 3D view, FIG. 25 showing the selector lever 2 in the non-deflected position, while FIG. 26 shows the first lever arm 2.1 deflected laterally in relation to the second lever arm 2.2. A spring element 27, which brings about the resetting of the first selector lever arm, is located in the area of the selector axis 26 that makes this deflection possible.

Figure 27:
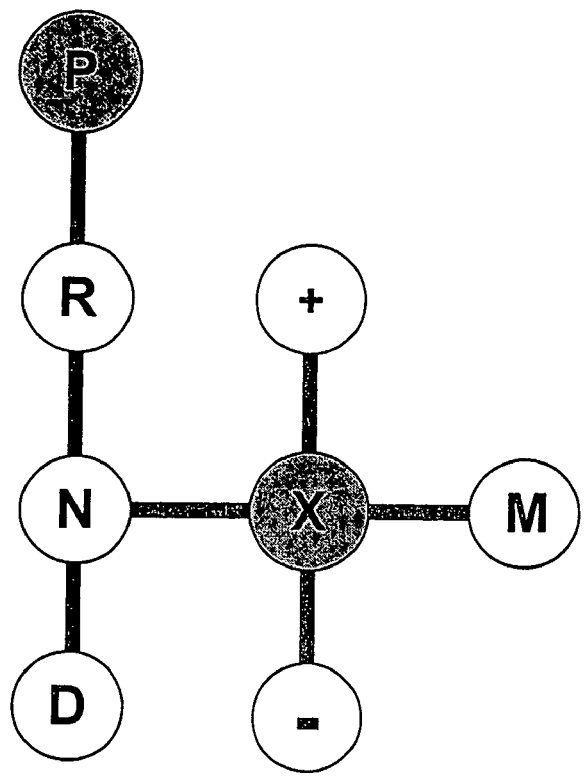
FIG. 27 is a schematic diagram showing a first variant of a shift pattern with two selector lever positions that have a stable locking and a plurality of unstable selector lever positions.
Figure 28:
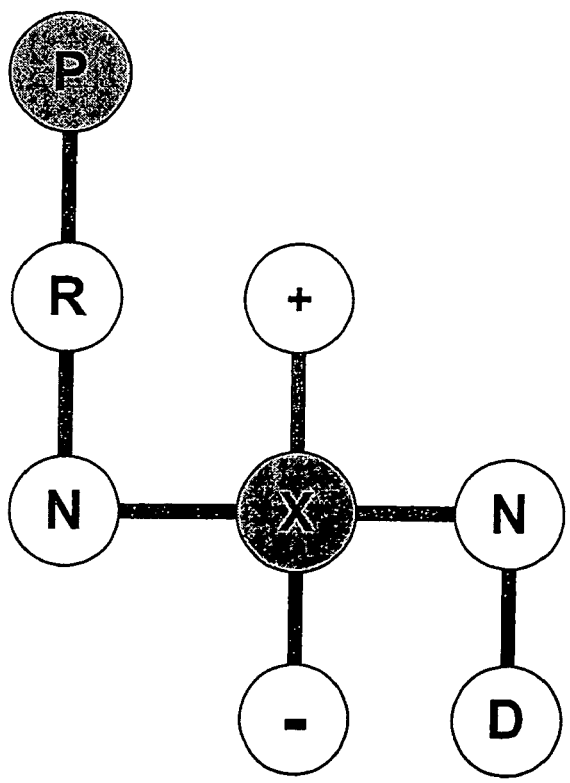
FIG. 28 is a schematic diagram showing a second variant of a shift pattern with two selector lever positions that have a stable locking and a plurality of unstable selector lever positions.

FIGS. 27 and 28 show two possible shift patterns, which have two shift positions P and X with a stable locking (on a gray background), and the other shift positions R, N, D, M, − and + are unstable and can thus be reached by tapping the selector lever only, the selector lever automatically dropping back into the stable position selected previously. Such an embodiment can be preferably achieved, with pleasant shifting forces and pleasant feeling of shifting, due to the fact that, as is described in the present invention, the weakest possible frictional forces will develop during the movement into the different shift positions.

It is also obvious that the above-mentioned features of the present invention are applicable not only in the particular combination described, but also in other combinations or alone without going beyond the scope of the present invention. Bringing about a mechanical reversal of the functions of the individual mechanical elements of the present invention is also within the scope of the present invention.

While specific embodiments of the invention have been shown and described in detail to illustrate the application of the principles of the invention, it will be understood that the invention may be embodied otherwise without departing from such principles.

LIST OF REFERENCE NUMBERS

1 Shifting device
2 Selector lever arm
2.1 First selector lever arm
2.2 Second selector lever arm
3 Knob
4 Sensor system
5 electric interface/plug-in connection
6 Frame
7 Fixed hinge axis
Free hinge piece
9 Rectilinear sliding pair
10 axis of rotation at hinge piece
11 Slide
12 Cable/Bowden cable
13 Cam
14 Elongated hole shifting gate
15 Shift axis mounted in frame
16 Spring system (leaf spring with roller)
17 Lever hinge axis
18 Cable fastening
19 Two-armed lever
20 Elongated hole
21 First hinge piece
22 Second hinge piece
23 Multiple hinge with rectilinear sliding pair
24 Roller
25 Leaf spring
26 Selector lever
27 Spring element
A First shifting gate area
B Second shifting gate area

What is claimed is:

1. A shifting device for a mechanical coupling-free transmission of shift commands to an automatic transmission of a motor vehicle to provide shift-by-wire shifting, the shifting device comprising:
   a frame;
   a selector lever for manually selecting shift commands for the transmission of the motor vehicle in at least one shift gate, wherein said selector lever can be moved manually into at least four positions (P, R, N, D), pivotable about at least one shift axis, said selector lever having a slot, said slot defining a shifting gate contour;
   a transmission device for transmitting the shift commands without mechanical coupling to the automatic transmission of the motor vehicle; and
   a mechanical coupling located between said selector lever and the transmission of the vehicle, said mechanical coupling activating the transmission parking state exclusively and automatically when said selector lever is engaged in a parked (P) position, said mechanical coupling being automatically uncoupled from the selector lever when the selector lever is pivoted out beyond a position adjacent to the P position, said mechanical coupling including a multiple hinge connection, said multiple hinge connection including a hinge piece having a first mount and a second mount, said multiple hinge connection being mounted to said frame via said first mount, said second mount engaging said shifting gate contour such that said second mount moves along said shifting gate contour of said selector lever, whereby said multiple hinge connection is connected to said selector lever.

2. A shifting device in accordance with claim 1, wherein said mechanical coupling comprises a cable or a linkage as a connection to the transmission of the vehicle.

3. A shifting device in accordance with claim 1, wherein said shifting gate contour of said selector lever is an elongated hole shifting gate, said second mount extending through said elongated hole shifting gate.

4. A shifting device in accordance with claim 1, wherein said mechanical coupling comprises a cable or a linkage as a connection to the transmission of the vehicle wherein said multiple hinge connection is arranged between said cable or said linkage and said selector lever.

5. A shifting device in accordance with claim 1, wherein said multiple hinge connection has exclusively hinge axes arranged in parallel to said shift axis of said selector lever.

6. A shifting device in accordance claim 1, wherein said multiple hinge connection comprises a hinge mounted on a frame side.

7. A shifting device in accordance with claim 1, wherein said transmission device includes an electronic or optical detection device for detecting positioning of said selector lever, said electronic or optical detection device being arranged in an area of the shift axis.

8. A shifting device in accordance with claim 1 above, wherein said mechanical coupling comprises a cable or a linkage as a connection to the transmission of the vehicle, said second mount being connected directly with said cable or said linkage, said second mounting being guided in the shifting gate slot.

9. A shifting device in accordance with claim 1, wherein said mechanical coupling comprises a cable or a linkage as a connection to the transmission of the vehicle and comprises a rectilinear sliding pair mounted on a frame side, at a connection to said cable or said linkage, wherein a pushing movement brings about an activation or deactivation of the transmission parking state.

10. A shifting device in accordance with claim 1, wherein said mechanical coupling comprises a cable or a linkage as a connection to the transmission of the vehicle and comprises a lever hinge mounted on a frame side at the connection to said cable or said linkage, wherein a pushing movement and thus activation or deactivation of the transmission parking state is preferably brought about by a movement of a lever on said cable.

11. A shifting device in accordance with claim 1, wherein said multiple hinge connection has a hinge axis arranged between other hinge axes.

12. A shifting device in accordance with claim 11, wherein said shifting gate contour has, on the one hand, a first shifting gate area, which forms a concentric circular arc about the shift axis of the selector lever and, on the other hand, a second shifting gate area, which approaches the shift axis of the selector lever as a function of the angle of the position of the selector lever about the shift axis.

13. A shifting device in accordance with claim 1, further comprising a spring-loaded cam provided at said selector lever for simulating shifting forces.

14. A shifting device in accordance with claim 13, wherein at least two positions (P, X) are locked in a stable manner by means of said spring-loaded cam and at least two positions (N, D, +, −) are designed as unstable positions that can be reached by tapping.

15. A shifting device in accordance with claim 1, wherein said selector lever is mounted, at least partially, indirectly or directly, additionally about a selector axis arranged at right angles to the shift axis.

16. A shifting device in accordance with claim 15, wherein said multiple hinge connection is connected to a cable or linkage, said cable or said linkage being connected to the automatic transmission of the motor vehicle.

17. A shifting device in accordance with claim 15, wherein a spring-loaded cam is arranged at said frame for the movement of said selector lever about the selector axis to simulate shifting forces.

18. A shifting device in accordance with claim 15, wherein a spring-loaded cam is provided for the movement of said selector lever about a selector axis to simulate shifting forces.

19. A shifting device in accordance with claim 1, wherein said selector lever is split into two at a level of a selector axis and an upper part of said selector lever is made pivotable about the selector axis and a lower part of said selector lever is made pivotable about the shift axis only.

20. A shifting device in accordance with claim 19, wherein said upper part of said selector lever is equipped with spring-loaded resetting devices, with a resetting spring which generates automatic resetting into a predetermined position.

21. A shifting device for a mechanical coupling-free transmission of shift commands to an automatic transmission of a motor vehicle to provide shift-by-wire shifting, the shifting device comprising:
    a mounting structure;
    a gearshift lever for manually selecting shift commands for the transmission of the motor vehicle in at least one shift gate, wherein said gearshift lever is manually movable into at least four positions (P, R, N, D), said gearshift lever being pivotable about at least one shift axis, said gearshift lever having a slot defining an elongated shifting gate contour;
    a transmitting device for non-mechanically transmitting the shift commands; and
    a mechanical bypass element selectively mechanically connectable to said gearshift lever and to the transmission, said mechanical bypass element mechanically connecting said gearshift lever to the transmission when said gearshift lever engages the shift gate designating a parked (P) position, whereby said gearshift lever mechanically shifts the transmission when said gearshift lever is located in said parked position, said mechanical bypass element being located between the transmission and said gearshift lever, said mechanical bypass element being automatically uncoupled from the gearshift lever when said gearshift lever is not positioned in said shift gate designating said parked (P) position, said mechanical bypass element including a multiple hinge connection piece having a first mount and a second mount, said multiple hinge connection piece being mounted to said mounting structure via said first mount, said second mount extending through said shifting gate contour of said gearshift lever such that said second mount follows a path defined by said shifting gate contour when said gearshift lever moves from one position to another position, whereby said mechanical bypass element is connected to said gearshift lever.

22. A shifting device in accordance with claim 21, wherein said mechanical bypass element includes a cable for connection to the transmission of the motor vehicle, said multiple hinge connection element being connected to said cable.

23. A shifting device in accordance with claim 21, wherein said shifting gate contour has a first shifting gate area and a second shifting gate area, said first shifting gate area forming a concentric circular arc about said shift axis of said gearshift lever, said second shifting gate area approaching said shift axis of said gearshift lever as a function of the angle of the position of said gearshift lever about said shift axis.

24. A shifting device in accordance with claim 21, wherein said mechanical bypass element includes a rectilinear sliding pair and another multiple hinge connection piece having a first mounting element and a second mounting element, said another multiple hinge connection piece being connected to said second mount of said multiple hinge connection piece, said rectilinear sliding pair being connected to said another multiple hinge connection piece via said first mounting element and said second mounting element.

25. A shifting device in accordance with claim 21, wherein said mechanical bypass element includes a rectilinear sliding pair, another multiple hinge connection piece and a third multiple hinge connection piece, said rectilinear sliding pair being connected to said another multiple hinge connection piece via said third multiple hinge connection piece.

* * * * *